United States Patent
Munier et al.

(10) Patent No.: US 10,012,404 B2
(45) Date of Patent: Jul. 3, 2018

(54) REAL-TIME SMART THERMOSTAT WITH FLOATING INSTRUCTION

(71) Applicant: WEEN, Aix-en-Provence (FR)

(72) Inventors: Nathanael Munier, Cernay la Ville (FR); Jean-Laurent Schaub, Cabries (FR)

(73) Assignee: WEEN, Aix en Provence (FR)

( * ) Notice: Subject to any disclaimer, the term of this patent is extended or adjusted under 35 U.S.C. 154(b) by 50 days.

(21) Appl. No.: 15/324,254

(22) PCT Filed: Jul. 9, 2015

(86) PCT No.: PCT/EP2015/065734
§ 371 (c)(1),
(2) Date: Jan. 5, 2017

(87) PCT Pub. No.: WO2016/005512
PCT Pub. Date: Jan. 14, 2016

(65) Prior Publication Data
US 2017/0176038 A1    Jun. 22, 2017

(30) Foreign Application Priority Data
Jul. 9, 2014 (FR) .................................... 14 56628

(51) Int. Cl.
*F24F 11/00* (2018.01)
*G05D 23/19* (2006.01)
(Continued)

(52) U.S. Cl.
CPC ........ *F24F 11/0012* (2013.01); *F24F 11/006* (2013.01); *F24F 11/0034* (2013.01);
(Continued)

(58) Field of Classification Search
CPC .................................................... F24F 11/00
See application file for complete search history.

(56) References Cited

U.S. PATENT DOCUMENTS

| 8,577,392 B1 | 11/2013 | Pai et al. |
| 2010/0127854 A1 | 5/2010 | Helvick et al. |
| (Continued) | | |

FOREIGN PATENT DOCUMENTS

| DE | 102011052467 A1 | 2/2013 |
| WO | WO 2014/015977 A2 | 1/2014 |

OTHER PUBLICATIONS

International Search Report and Written Opinion in PCT/EP2015/065734 dated Sep. 14, 2015, with English translation. 17 pages.
(Continued)

*Primary Examiner* — Tejal Gami
(74) *Attorney, Agent, or Firm* — Womble Bond Dickinson (US) LLP

(57) ABSTRACT

The invention relates to a method for adjusting temperatures of a built structure provided with a thermal adjustment system configured to adjust the built structure to a predetermined living temperature. Said method includes implementing, via a data processing module, the steps of: (a) detecting absence of a user, (b) sending, to said system, a limiting instruction whereby said system interrupts adjustment to the living temperature; (c) estimating a return travel time of the user on the basis of geolocation data; (d) determining a return temperature on the basis of a comfort temperature, different from the living temperature, and on the basis of the return travel time, the return temperature allowing said system to reach the comfort temperature during the return travel time; and (e) sending, to said system, a return instruction whereby said system adjusts to the return temperature.

19 Claims, 9 Drawing Sheets

Figure 1:
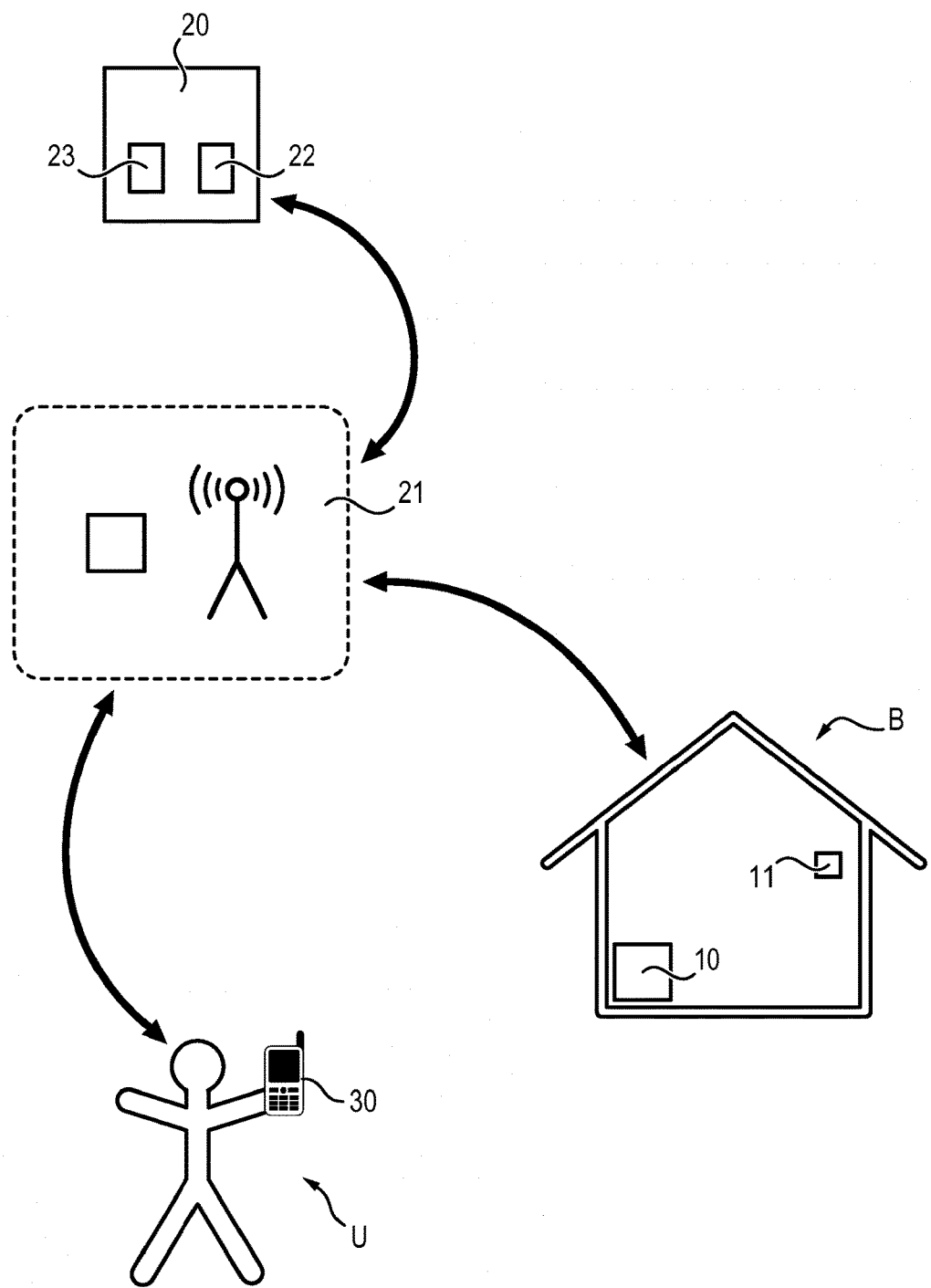

(51) Int. Cl.
| | |
|---|---|
| *H04L 12/28* | (2006.01) |
| *H04W 4/02* | (2018.01) |
| *F24F 11/30* | (2018.01) |
| *H04W 4/029* | (2018.01) |
| *F24F 11/62* | (2018.01) |
| *F24F 120/10* | (2018.01) |
| *F24F 11/56* | (2018.01) |
| *F24F 110/12* | (2018.01) |
| *F24F 120/12* | (2018.01) |
| *F24F 130/10* | (2018.01) |
| *F24F 11/65* | (2018.01) |
| *F24F 130/00* | (2018.01) |

(52) U.S. Cl.
CPC .......... *F24F 11/0086* (2013.01); *F24F 11/30* (2018.01); *F24F 11/62* (2018.01); *G05D 23/1905* (2013.01); *G05D 23/1923* (2013.01); *H04L 12/2818* (2013.01); *H04W 4/028* (2013.01); *H04W 4/029* (2018.02); *F24F 11/56* (2018.01); *F24F 11/65* (2018.01); *F24F 2011/0013* (2013.01); *F24F 2011/0035* (2013.01); *F24F 2011/0058* (2013.01); *F24F 2011/0064* (2013.01); *F24F 2011/0068* (2013.01); *F24F 2110/12* (2018.01); *F24F 2120/10* (2018.01); *F24F 2120/12* (2018.01); *F24F 2130/00* (2018.01); *F24F 2130/10* (2018.01)

(56) References Cited

U.S. PATENT DOCUMENTS

| | | |
|---|---|---|
| 2010/0161149 A1 | 6/2010 | Nguyen et al. |
| 2011/0231020 A1 | 9/2011 | Ramachandran et al. |

OTHER PUBLICATIONS

Search Report in French Application No. 14566628 dated Apr. 3, 2015, with English translation coversheet. 8 pages.

REAL-TIME SMART THERMOSTAT WITH FLOATING INSTRUCTION

GENERAL TECHNICAL FIELD

The invention relates to the field of energy management optimization.

More particularly, the invention relates to a method for regulating the temperature of a built structure equipped with a thermal regulation system.

STATE OF THE ART

Thermal regulation (via systems called HVAC (Heating, Ventilation and Air-Conditioning)) represents over half the energy used in a building.

Apart from the improvement in isolation and efficacy/efficiency of HVAC systems, energy savings may be made by controlling and regulating the temperature of the housing more effectively.

More particularly, optimization of operating ranges and temperature goals (floating instruction, i.e., dynamic) may be undertaken without as such impairing the comfort of the occupants of the housing. Given the local meteorology, thermal modeling:
  maximizes energy savings,
  improves the qualitative sensation of the system by the occupant.

An additional innovation has been taking into account absences and presences of the occupants of the housing. Evolved thermostats may be configured to lower the instruction over predefined ranges during which the occupants are not supposed to be present in the housing. But if the occupants do not return at the time provided by the thermostat, the housing will be cold or will have heated needlessly (respectively hot or cooled).

To resolve this difficulty, document WO 2013020970 proposes the geolocation of occupants outside the habitat, which knows whether the occupants are going away from or approaching the habitat, with the aim of regulating the temperature of the habitat.

Document WO 2014015977 as such especially describes a concept for estimation of the arrival time of the occupant of the housing for regulating the temperatures as a function.

Document WO 2012068495 proposes lowering the instruction after a given time as soon as the absence of the occupant is detected.

Finally, document WO 2013058966 presents a method for learning habits of the user as a function of completed cycles so as to anticipate temperatures to be controlled.

These known technologies exploit geolocation and local learning for more effective thermal regulation and substantial savings, but they may still be improved.

In particular, these techniques are incapable of considering unforeseen nearby travel (under half an hour, for example), which represent 80% of absences of a user: going out for pizza, visiting parents, going to the doctor, etc.

Even though such absences may sometimes last for hours, the fact that the user may return at any moment in a few minutes obligates known methods to keep the housing at nominal temperature, resulting in useless power consumption.

It would be preferable to have a method for regulating the temperature which allows optimal thermal regulation including real energy savings during unforeseen absences, and ensures comfort and simplicity of optimization for the user.

PRESENTATION OF THE INVENTION

To eliminate the limitations presented previously, the invention proposes a method for regulating the temperature of a built structure equipped with a thermal regulation system configured to regulate temperature of said built structure to a predetermined living temperature, in an operating mode by default, said method comprising, via a data-processing module, performing steps of:
  (a) Detection of an absence of a user in the built structure,
  (b) Emission to the thermal regulation system of an operating limitation instruction of said system by which the thermal regulation system interrupts regulation of the temperature of the built structure to the living temperature
  (c) Estimation as a function of geolocation data of the user of a return travel time of the user,
  (d) Determination of a return temperature as a function of a comfort temperature, different to the living temperature, and of said return travel time, the return temperature being calculated to let the thermal regulation system reach the comfort temperature during the return travel time,
  (e) Emission to the thermal regulation system of a return instruction by which the thermal regulation system regulates the temperature of the built structure to the return temperature.

Because of this method, it is possible to save on each absence of the user without degrading the comfort when the latter returns. In fact, the fact of applying a floating instruction in place of maintaining the temperature during the absence, in the case of heating, makes for power savings. Also, due to calculating a floating instruction as a function of the length of absence and thermal performance of the built structure, the comfort temperature is assured when the user returns. The length of absence is advantageously defined by the planning and/or the travel time and/or the learning of usual places and/or the question CQ.

Advantageously, the invention comprises the following characteristics, taken singly or in combination:
  the limitation instruction of step (b) consists of stopping the thermal regulation system, said system then operating in a mode known as free from the start of absence of the user,
  step (e) is performed only if the temperature of the built structure is outside an interval defined by the living and comfort temperatures,
  step (b) comprises, when the temperature of the built structure reaches a predefined extreme temperature (Te), emission to the thermal regulation system of a temperature maintenance instruction, by which the thermal regulation system regulates the temperature of the built structure to said extreme temperature,
  the extreme temperature, the comfort temperature and the return temperature are determined by the data-processing module as a function of at least thermal modeling data of the built structure comprising meteorological data recovered from a central server and thermal characteristics of the built structure originating from an experimental design containing the data relative to the built structure during previous uses of the method,
  steps (c) to (e) are repeated such that the return temperature tends towards the comfort temperature (Tc) at the time when the user is again present in the built structure, calculation of the return temperature takes into account the time interval between two geolocations in addition to estimation of the return travel time, step (c) comprises receipt of the geolocation data in the broad sense from a mobile terminal of the user comprising location means, step (c) comprises emission to the mobile terminal of a question instruction by which the mobile terminal queries the user on his estimation of the return travel time, such that the return temperature is adapted as a function of the response of the user, detection of the absence of the user is carried out by at least one of the following methods: comparison of geolocation data of the mobile terminal of the user and geolocation reference data of the built structure, connection/disconnection from a local network, or detection of absence via presence sensors, step (c) comprises filtering of the geolocation data, said filtering identifying geostatic situations, the comfort temperature has a spread from 0.5 to 5°, preferably from 0.5 to 2°, and preferably from 0.8 to 1.2°, relative to the living temperature, when the presence of a user (U) is detected in the built structure (B), the method comprises a step (f) for emission to the thermal regulation system of a regulation instruction of the temperature by which the thermal regulation system switches back to the operating mode by default, the method comprises a prior step for emission to the thermal regulation system of a pre-limitation instruction before absence of the user, such that when the user leaves, the comfort temperature is already attained, the pre-limitation instruction is triggered by local learning of absences of the user, the method comprises the following steps:
  step (a) is performed for each user of the built structure,
  step (b) is performed if step (a) is verified for each user of the built structure,
  step (c) is performed for each user of the built structure,
  step (d) is performed by using the lowest possible estimation of the return travel time, the thermal regulation system comprises a heating system, and the return temperature is less than the comfort temperature, in turn less than the living temperature, the thermal regulation system comprises an air-conditioning system, and the return temperature is greater than the comfort temperature, in turn greater than the living temperature.

The invention also proposes a temperature-regulation unit of a built structure, comprising a temperature-regulation system, a data-processing server, comprising a data storage module and a data-processing module, configured to execute:

a module for detection of absence of the user, a module for triggering an operation limitation instruction of said system by which the thermal regulation system interrupts the regulation of the temperature of the built structure at the living temperature, a module for estimation of the return travel time of the user as a function of geolocation data of the user, a module for determination of a return temperature as a function of a comfort temperature different to the living temperature and of said return travel time, the return temperature being calculated for let the thermal regulation system reach the comfort temperature during the return travel time, a module for emission to the thermal regulation system of a return instruction, by which the thermal regulation system regulates the temperature to the return temperature.

Finally, the invention proposes a built structure comprising a temperature-regulation system, and a thermostat connected to a server according to the preceding claim, or to a server adapted to execute a method as described previously.

PRESENTATION OF THE FIGURES

Figure 2:
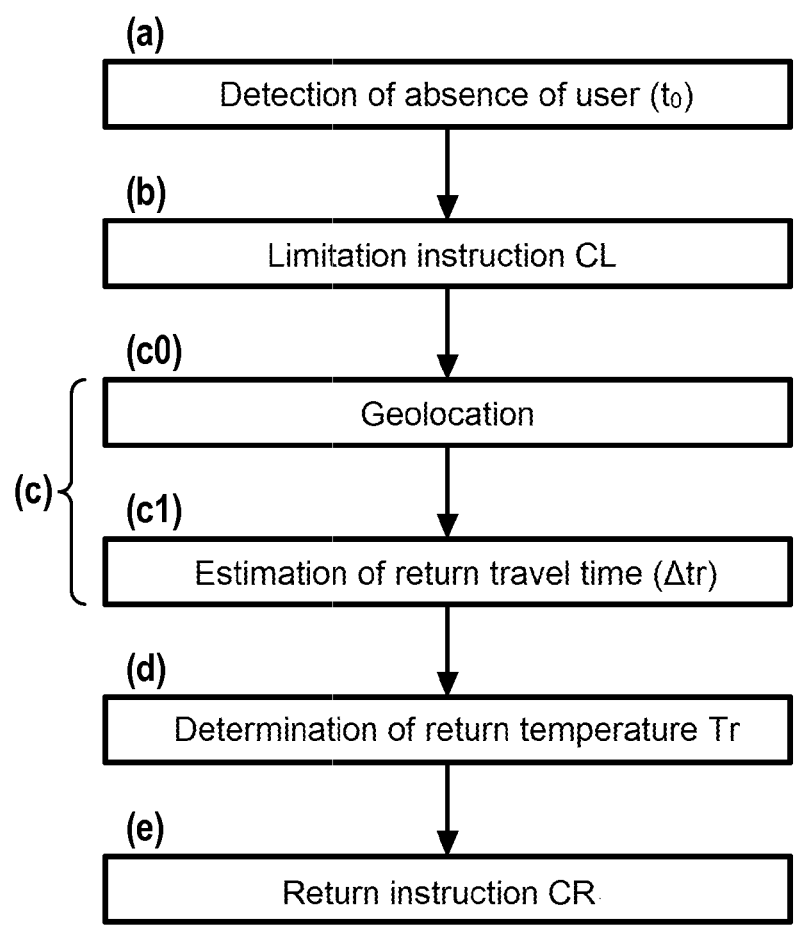
Figure 3:
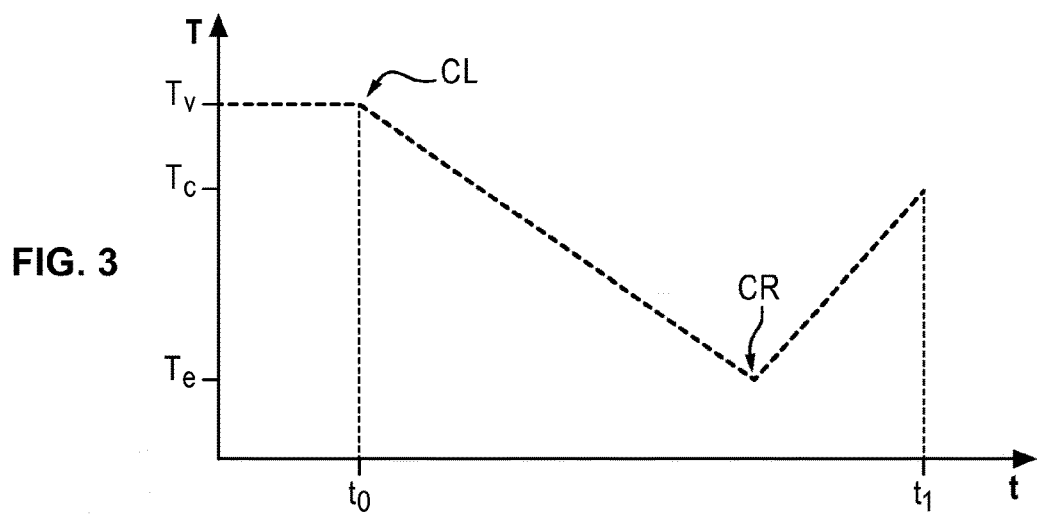
Figure 4:
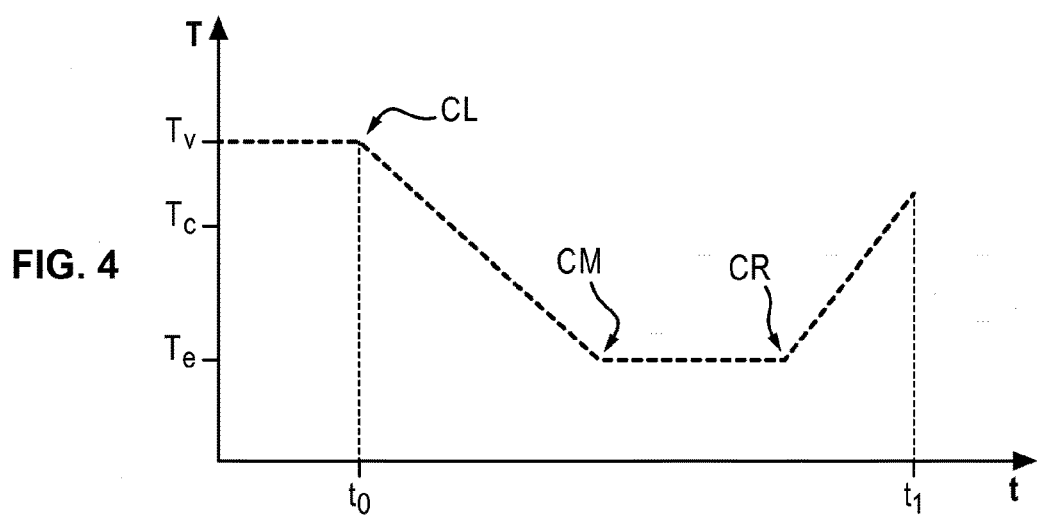
Figure 5:
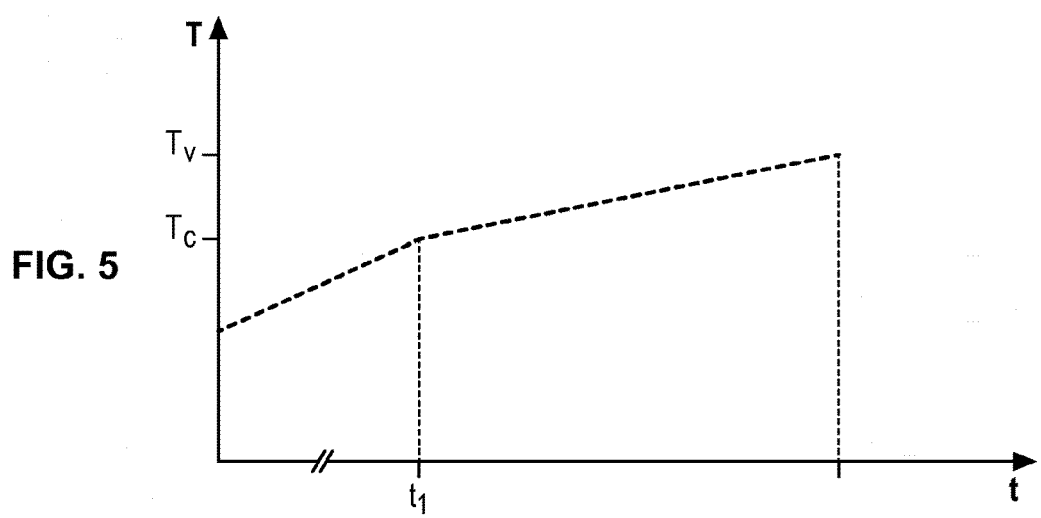
Figure 6:
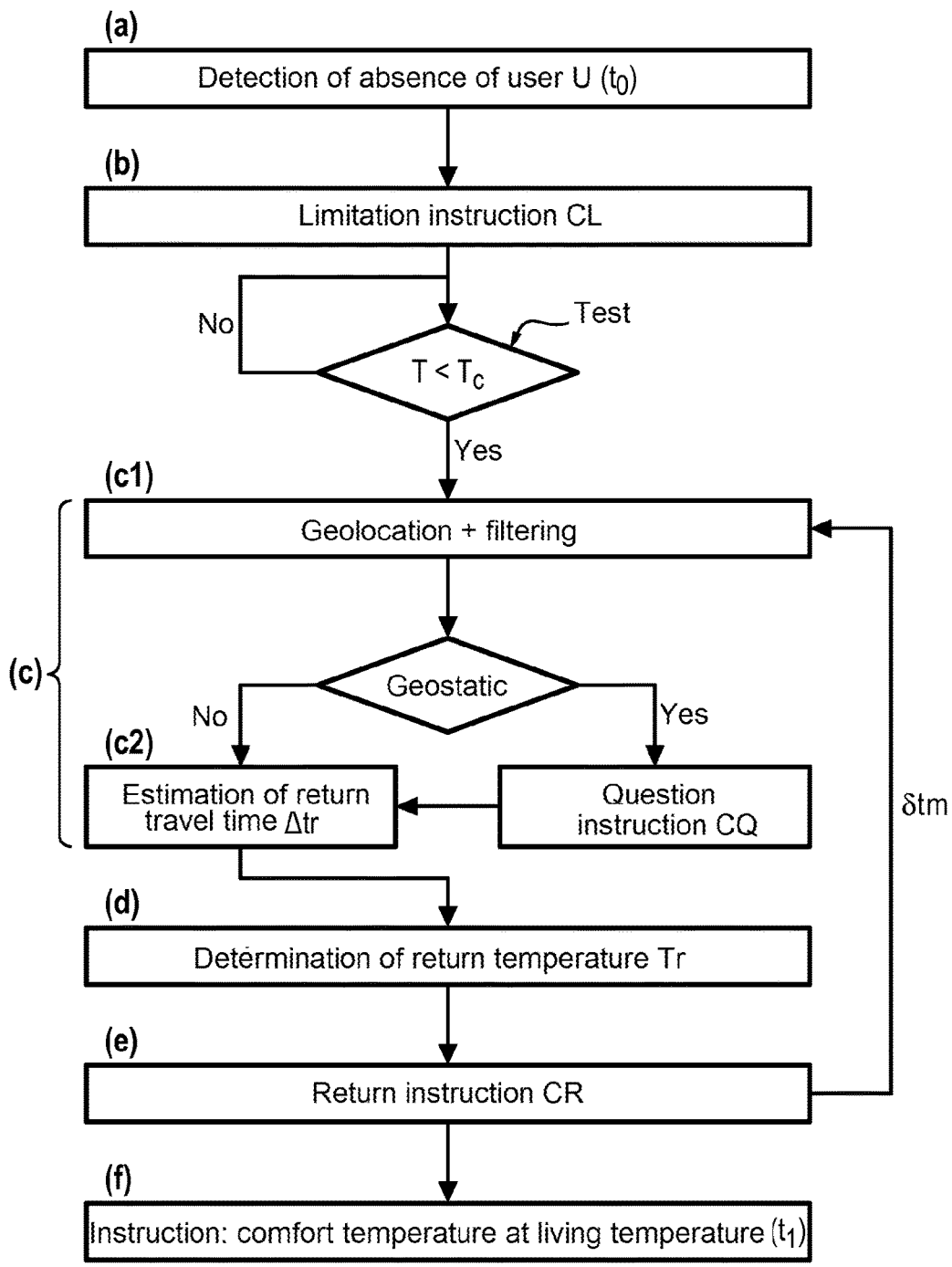
Figure 7A:
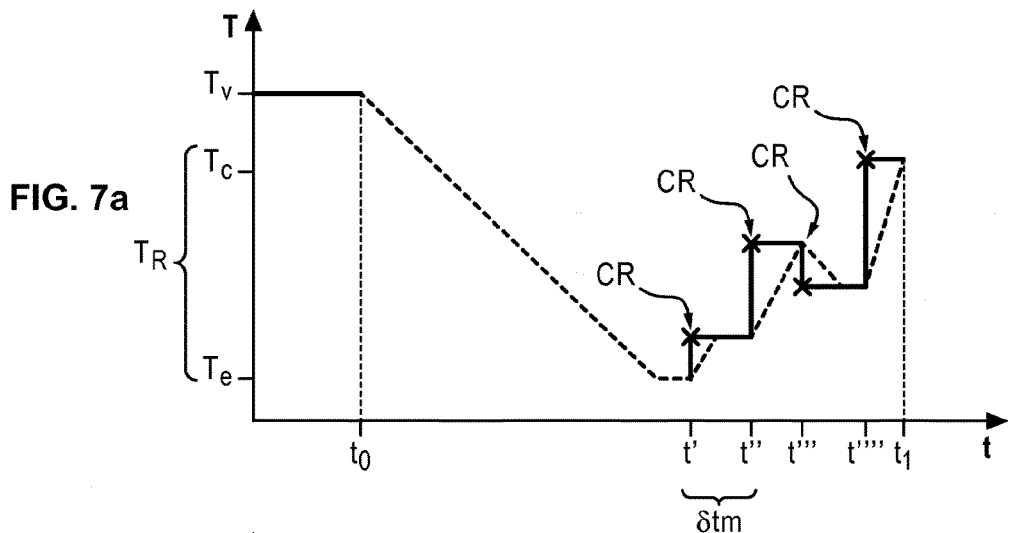
Figure 7B:
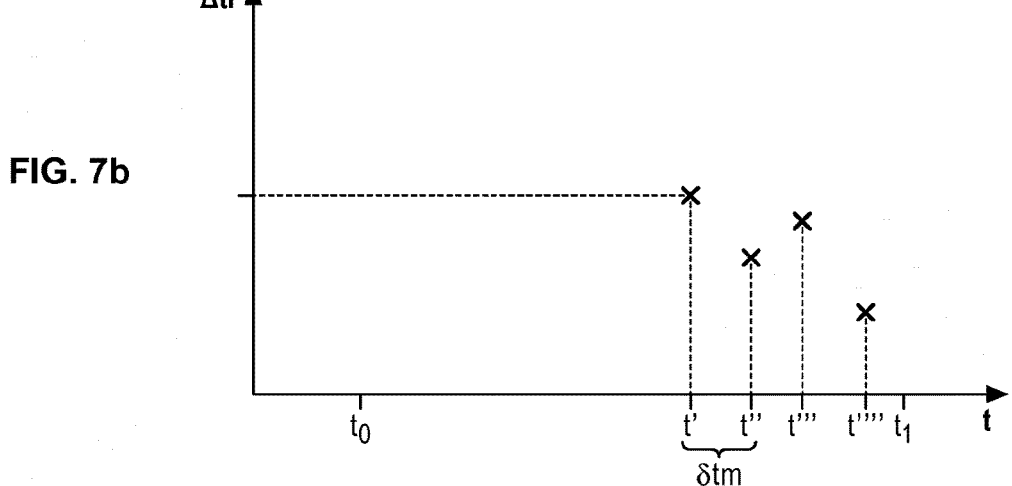
Figure 7C:
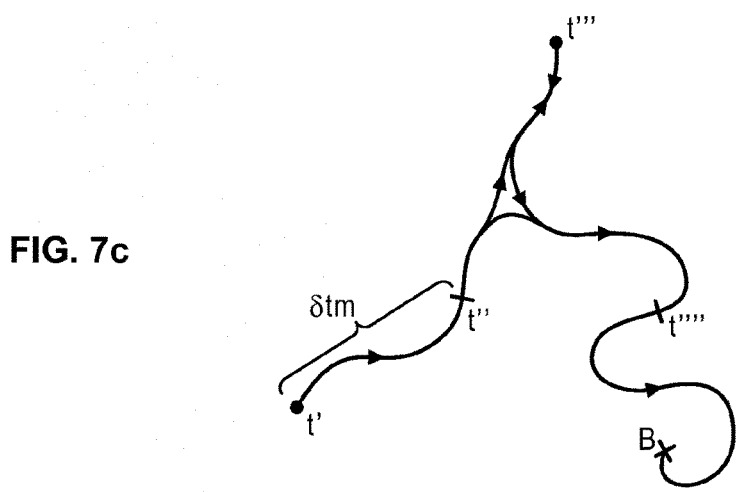
Figure 8:
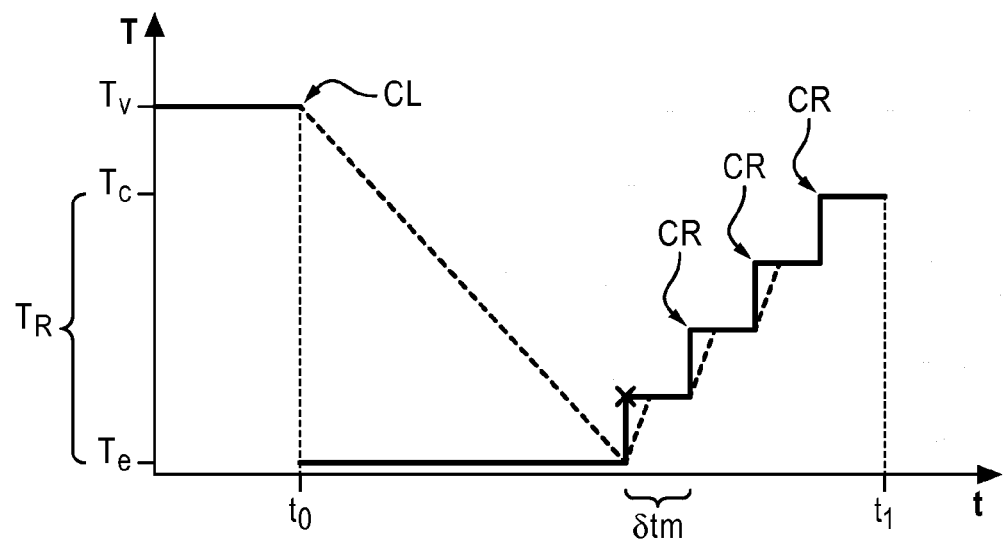
Figure 9:
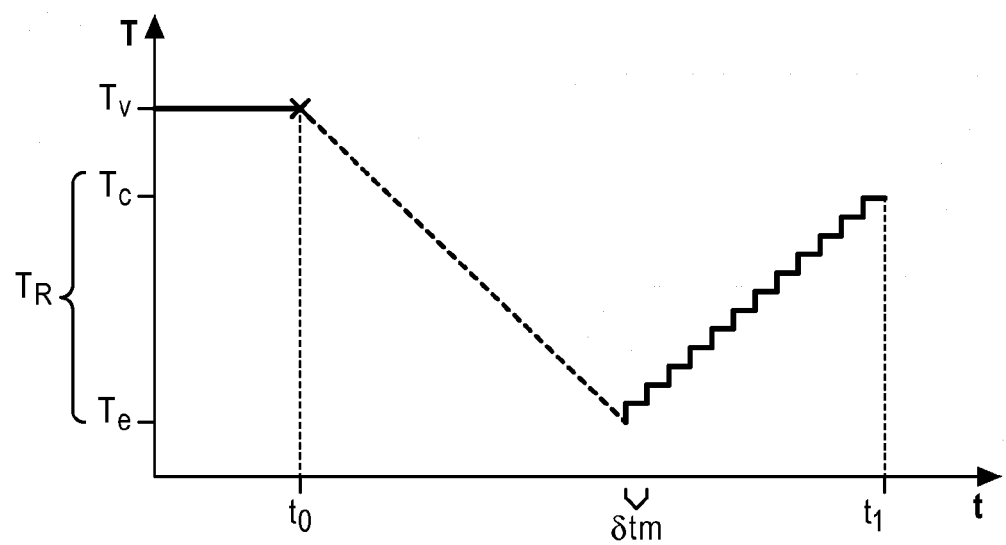
Figure 10:
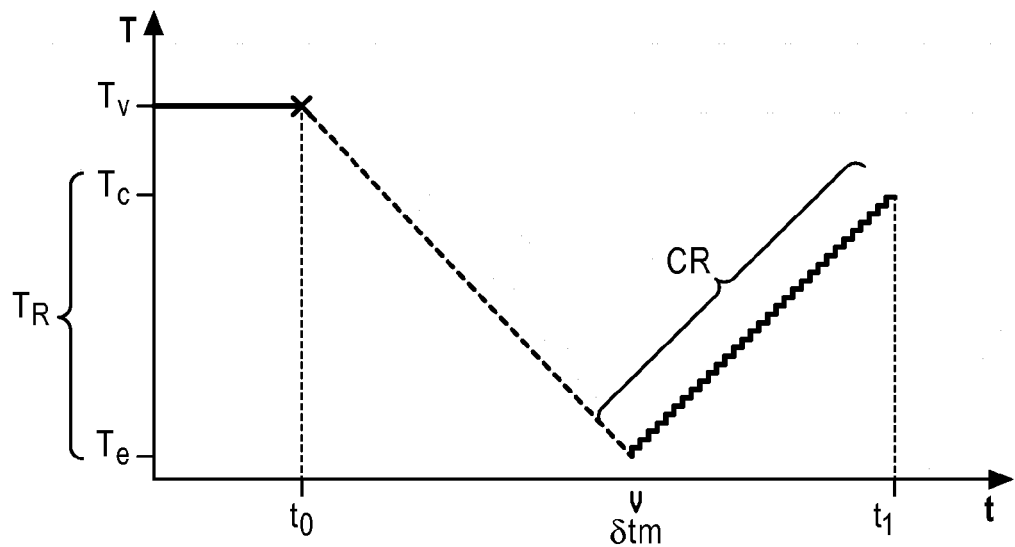
Figure 11:
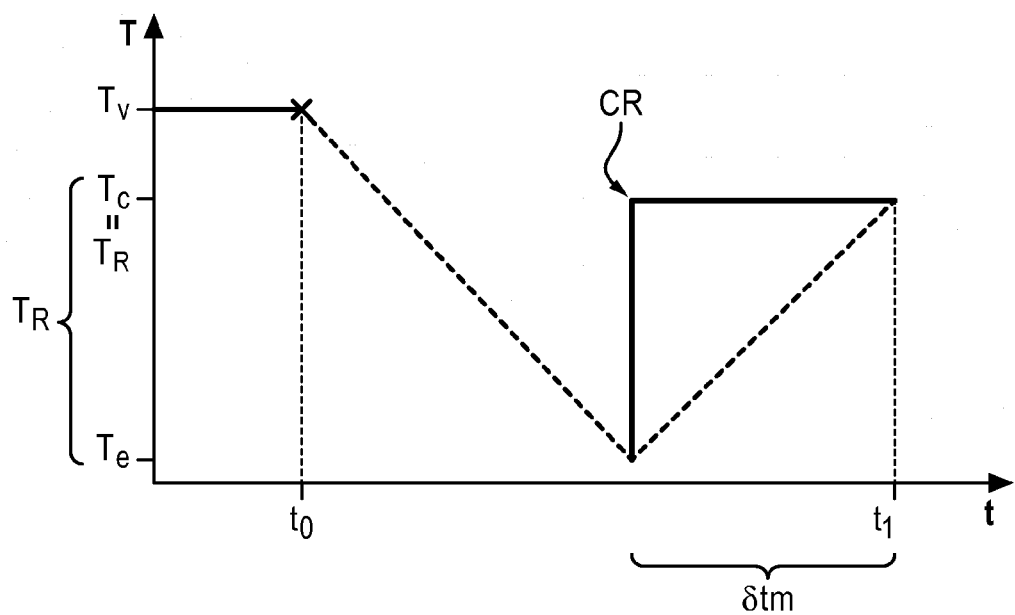
Figure 12:
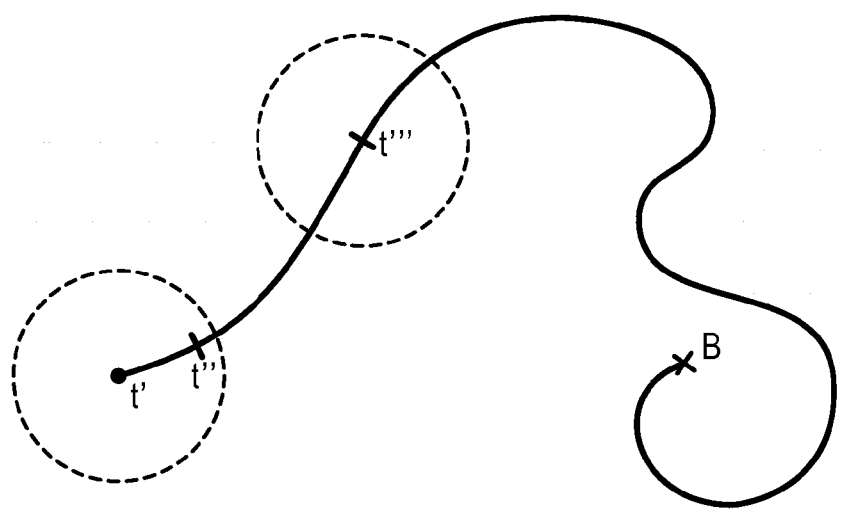
Figure 13:
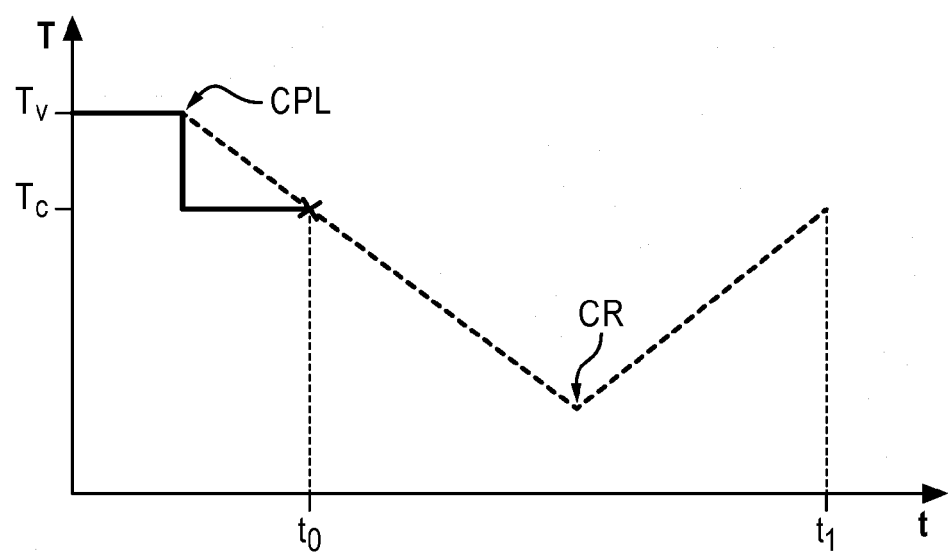
Figure 14:
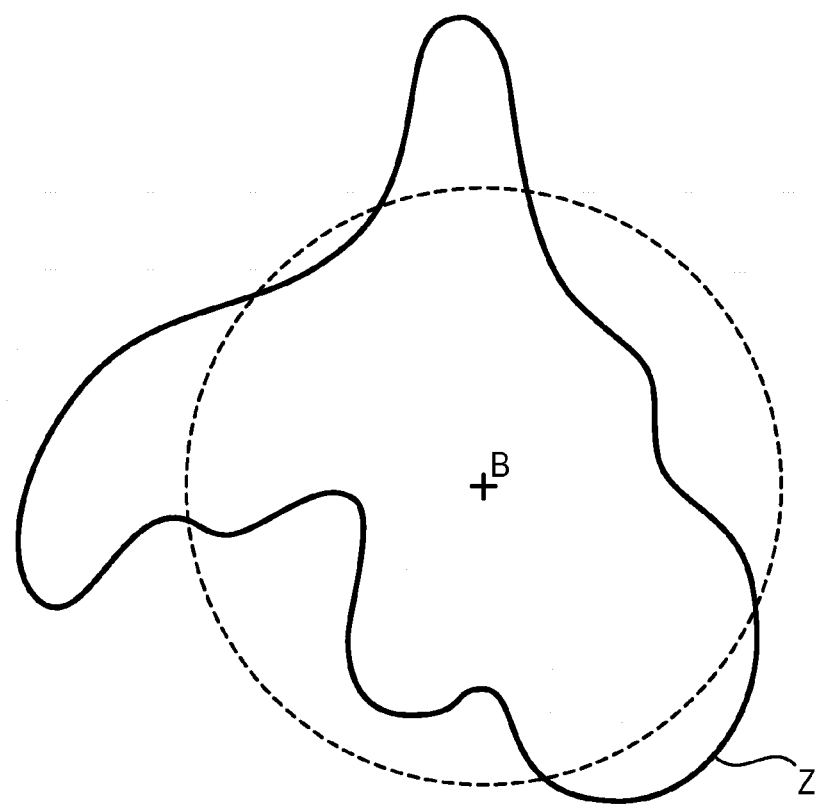
Figure 15:
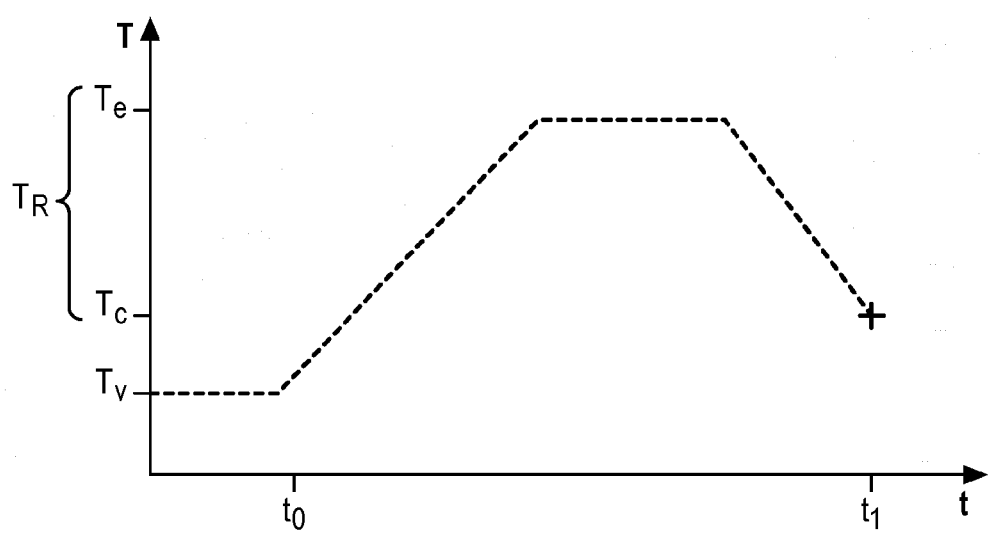

Other features, aims and advantages of the invention will emerge from the following description which is purely illustrative and non-limiting and which must be considered with respect to the appended drawings, in which:

FIG. 1 illustrates architecture for executing the method according to the invention, FIG. 2 illustrates a method according to the invention, FIGS. 3 to 5 illustrate diagrams of the instruction temperatures and temperatures of the built structure according to embodiments of a method according to the invention, FIG. 6 illustrates a method having different embodiments according to the invention, FIGS. 7a, 7b, 7c illustrate the adjustment of the return temperatures as a function of estimations of return travel time, FIGS. 8 to 11 illustrate different curves of instruction temperature and of temperature of the built structure as a function of some parameters, FIG. 12 illustrates geolocation filtering, FIG. 13 illustrates anticipation of the absence of the user, FIG. 14 illustrates a zone of common travels, FIG. 15 illustrates a built structure temperature curve in the case of an air-conditioning system.

The instruction temperature curves are shown in full lines and the temperature curves of the built structure are shown in dots.

DETAILED DESCRIPTION

The present thermal regulation method is carried out in an environment of the type of that shown by FIG. 1.

The invention relates to a method for thermal regulation of a built structure B, the built structure comprising a thermal regulation system 10. The built structure B is inhabited by at least one user U and signifies any construction in which a user U may be found. Typically, the built structure B is a house or apartment.

A temperature probe 11 is connected to a server 20 by a communications network 21, such as a mobile telephone network or internet. The probe 11 especially measures the temperature T of the built structure B, and sends a signal to the server 20.

A mobile terminal 30 of the user U may be connected to the server 20 by the communications network. The mobile terminal 30 may be any equipment capable of connecting to the communications network 21. It may be for example a smartphone, a touch pad, etc.

The mobile terminal 30 typically comprises a data-processing module, location means (for example a GPS—"global positioning system", a base station triangulation "system", a WIFI connection, etc.), and interface means such as a screen. The mobile terminal 30 may be integrated into a vehicle of the user U. In general, "mobile terminal" means any device having communication means whereof travel coincides with those of the user U.

The thermal regulation system 10 is adapted to regulate a temperature T of the built structure B. Regulating, means a method, especially by retroaction given the temperature of the built structure, for setting an instruction temperature in the built structure B. Regulating therefore means acting on the temperature (having it evolve up or down) either actively (regulation towards a target temperature) or passive (fully or partially stopping heating) or air-conditioning, for example.

In default operation, i.e., when the built structure B is inhabited from a sufficiently long time for the permanent or standard regime to be reached (i.e. a significantly long time before a time characteristic of change in temperature of the built structure), the temperature T is at a living temperature Tv, for example 21° C. in winter and 24° C. in summer. The thermal regulation system 10 uses heating and/or air-conditioning, i.e., it comprises a heating and/or air-conditioning system.

The thermal regulation system 10 may function on electricity, gas, fuel, etc. and comprise emitters such as radiators, "heating" floors, etc.

Nominal power $P_n$ of said thermal regulation system 10 is defined, to which, for a built structure B and given meteorological conditions, a nominal regulation speed $V_n$, may be corresponded, i.e., a nominal variation in temperature T of the built structure B per unit of time t. Coupling these data and the thermal characteristics of the built structure B (type of material, windowed surface, type of thermal regulation system, volume of the built structure, etc.) also stored on the storage module 23 (and for example input by the user U), originating from the post-processing of the data stored in the storage module 23 the built structure B may be modeled thermally, especially via evaluation of the thermal flows. This thermal modeling of the built structure B is done by the processing module 22 of the server 20.

Alternatively, the skilled person could model the heat dynamics of the house via empirical data designated as "experimental design".

Alternatively, the experimental design may accumulate data relative to the dynamics of evolution of the temperature T in the built structure B in many situations (variety of climatic conditions, conditions of occupation, etc.) and produces instruction reference, temperature values, etc. In light of the non-ideal character of the regulation system and of the built structure (reaction time, variability, etc.), It is evident that the experimental design may be corrected slightly so as to incorporate safety margins.

As mentioned previously, the server 20 is connected to the communications network 21. It conventionally comprises a data-processing module 22 (such as a processor) and a data storage module 23 (for example a hard drive). The server 20 may be dedicated equipment (arranged in the built structure B or remote), or may be integrated into a personal computer, an Internet access box, etc. Also, the server 20 may be integrated into the mobile terminal 30.

Preferably, the server 20 receives local meteorological data (external temperature, humidity rate, sunshine, wind direction and force, atmospheric pressure, etc.) of the region of placement of the built structure B. These meteorological data preferably come from a nearby weather station and are sent via internet and stored in the storage module 23 of the server 20.

The following description takes the example of a heating system. It suffices to symmetrize the values around the living temperature Tv to obtain the method in the case of an air-conditioning system. The skilled person may easily adapt the method ad hoc.

Also, the method is described for a single user U; the case for several users (family) will be mentioned hereinbelow.

The aim of the invention is to optimize energy savings and ensure a comfort temperature Tc when the user returns to the built structure B after any absence. The comfort temperature Tc is a temperature different to the living temperature and which is different to it for example by 0.5° to 5°, preferably from 0.5 to 2°, preferably from 0.8° to 1.2°. In the case of the heating system, said comfort temperature Tc is less than the living temperature Tv. In fact, the user U does not immediately feel the real temperature of the built structure B after an absence and he needs some time to regulate to the temperature difference between the exterior and the built structure B. It is therefore not necessary for the built structure B to be directly at the living temperature Tv when the user U returns. During the acclimatization time, the temperature T will evolve from the comfort temperature Tc to the living temperature Tv without the user U suffering from cold. The comfort temperature Tc is therefore a transition temperature which improves energy savings. It should be noted that in some cases the comfort temperature Tc may be variable as a function of external meteorological conditions or seasons for example.

The comfort temperature Tc may be calculated by the data-processing module 22 of the server 20 by way of the experimental design and/or the thermal modeling of the built structure B to adapt it as a function of periods, and/or determined by the user U. The time necessary for moving from Tc to Tv must be less than the time for adaptation of the body to its environment, so that the latter does not feel the difference in temperature.

In reference to FIGS. 2 and 3, in a first step (a) absence of the user U from the built structure B is detected when the user U leaves the built structure B, at the time $t_0$.

The absence $t_0$ of the user U may be detected by comparison of location data provided by the mobile terminal 30 and location data of the built structure B. The comparison may be made by the mobile terminal 30 or by the server 20. Alternatively, absence of the user U may be marked by detection of closing of an entry door, or by signaling of the user U, for example by means of an interrupter, by WIFI signal loss, by disconnection of a local network, or by detection via presence sensors.

In a second step (b) (see FIGS. 2, 3), an operating limitation instruction CL is sent to the thermal regulation system 10. In the case of the heating system, the limitation instruction CL is in this case a decrease instruction by which the thermal regulation system 10 regulates the temperature T of the built structure B down. The invention functions in a mode known as "free", also called "free intermittence", i.e., the lowest attainable temperature T is attained during each absence. The limitation instruction CL may integrate an instruction temperature or not.

The limitation instruction CL may consist of either diminishing the power of the thermal regulation system 10, or interrupting it completely, enabling a faster drop in temperature T. In all cases it will be evident that the limitation instruction causes a drop in energy consumption of the thermal regulation system 10, and therefore of the built structure B.

The invention further provides a hold instruction CM in the event where the temperature T of the built structure B reaches an extreme temperature Te (see FIG. 4). The extreme temperature is generally set by public protection agencies. Typically, it may be a minimum temperature of 8° C. in France. At his convenience the user may decide in advance which extreme temperature Te to choose or choose to let the data-processing module 22 determine it. Typically, the limitation instruction CL may include an instruction temperature equal to the extreme temperature Te.

The operation of the method remains unchanged.

In a third step (c), geolocation of the user U is performed in a first part c1. In a second part c2, the return travel time Δtr of the user U is estimated as a function of geolocation data of the user U.

The geolocation data typically originate from the location means of the mobile terminal 30 of the user U. Estimation of the return travel time Δtr is undertaken by analysis of the position of the user U and known road schemes, of speeds of transport means (car, metro, walking, bike, etc.), of the state of traffic, etc.

Said analysis is performed by the server 20 after sending of geolocation data by the mobile terminal 30.

Alternatively, said analysis may be performed by the mobile terminal 30 which then sends said estimation to the server 20 via the communications network 21.

In a fourth step (d), a return temperature Tr is calculated as a function especially of the comfort temperature Tc and of said return time Δtr. "Return temperature" means a temperature of the built structure B from which the thermal regulation system 10 is capable in the return time Δtr of reaching the comfort temperature Tc. In other words, this return temperature Tr is calculated to ensure a temperature spread with the comfort temperature Tc which may be caught up by the thermal regulation system 10 during the return time Δtr. To refine this return temperature as accurately as possible, estimation of the return temperature Tr advantageously involves the experimental design or else the thermodynamic data such as the nominal power $P_n$ of the thermal regulation system 10 and its consumption, the thermal modeling of the built structure B (characteristics of the built structure and meteorological data).

Calculation is performed by the processing module 22 of the server 20 and as explained optionally integrates a safety margin, at the top, to mitigate any return faster than provided (excess speed, unforeseen shortcut) and measuring inaccuracies and/or non-uniformity of heat in the built structure B.

The return temperature Tr is therefore (in the case of heating) the lowest temperature to which the built structure B may drop for which the comfort temperature Tc may be attained when the user U returns to the built structure B.

In the case of the heating system, the return temperature Tr is less than or equal to the comfort temperature Tc.

In a fifth step (e) (see FIGS. 2, 3), a return instruction CR is emitted, by which the thermal regulation system 10 regulates the temperature T to the return temperature Tr.

Typically, the instruction is emitted by the server 20 to the thermostat 11 which controls the thermal regulation system 10.

The method advantageously comprises an emission step (f) of a regulation instruction of the temperature T to switch from the comfort temperature Tc to the living temperature Tv when the presence of a user U is detected in the built structure B (see FIG. 5). This is a return to the operating mode by default.

To optimize energy savings to a maximum, steps (c) to (e) are repeated at preferably regular intervals $\delta_{tm}$, (see FIG. 6). In fact, since the return of the user U is often unknown, it is necessary for the system to re-evaluate the return instruction CR so as to adjust it to the optimal return temperature Tr, i.e., the lowest possible while letting the heating system reach the comfort temperature Tc when the user U returns. In FIGS. 7a, 7b, 7c, where t', t" and t'" represent the instants at which geolocations are made, the return temperatures Tr are adjusted as a function of estimation of the return travel time Δtr linked to geolocation. The resulting instruction temperature curve is in the form of a level, each end of level corresponding to launching a return instruction CR.

FIGS. 8 to 11 illustrate different curves of instruction temperature (solid lines) and of temperature of the built structure B (dotted lines) according to the length of the interval $\delta_{tm}$. The less the interval $\delta_{tm}$, the shorter the levels (see FIG. 9). When the interval $\delta_{tm}$ tends towards 0, i.e. the location and sending of return instruction CT occur quasi-continuously, the instruction temperature curve tends towards a "smoothed" temperature curve (see FIG. 10). Alternatively, it will be evident that the invention is not limited to regular repetition of steps (c) to (e). In particular, in the event where it is no longer possible to get geolocation data (for example if the user is in a tunnel, or if his mobile terminal is off), it is possible to define for security reasons the return temperature Tr equal to the comfort temperature Tc: the temperature curve T does not have a level (see FIG. 11). Activation of security occurs only when the temperature T is less than the comfort temperature Tc. Alternatively, in the event of loss of geolocation data, the method switches automatically to a programmable regulation mode based on the hours of presence and absence and/or the effective presence of the user or input in the terminal 30 of the preferred temperature T of the built structure B.

It should be noted that the return temperature Δtr corresponds in fact to the minimum temperature so that the thermal regulation system 10 may connect the comfort temperature Tc to an iteration ($\delta_{tm}$). In this way, the return temperature Tr may anticipate this iteration. In other words, this return temperature Tr is calculated to ensure a temperature spread with the comfort temperature Tc which may be caught up by the thermal regulation system 10 during the return time Δtr from which the interval $\delta_{tm}$ has been subtracted. When the interval $\delta_{tm}$ is reduced, the interval becomes small relative to the estimation of the return time Δtr and it becomes possible to assimilate the two values such that convergence of the temperature of the built structure B towards the comfort temperature Tc is ensured: when $\delta_{tm}$ tends towards 0, the return temperature Tr tends towards the comfort temperature Tc (see FIG. 10). It may be possible to model Δtr as a continuous function of time (updated each time steps (c) to (e) are performed, i.e. every $\delta_{tm}$).

Also, because of the safety margin optionally provided in evaluation of the return temperature Tr and measurement and/or non-uniformity inaccuracies of heat in the built structure B, the built structure is effectively at the comfort temperature Tc when the user returns to the built structure B.

It is important to note that the temperature T curves of the built structure B are separate to the instruction temperature curves.

Steps (c) to (e) may also be conducted dynamically, i.e. the return temperature Tr is a refined function of the estimation of the return time Δtr. In this embodiment, the temperature T of the built structure B may follow the instruction of the return temperature Tr, such that the temperature of the built structure converges mathematically towards the comfort temperature Tc. Δtr then becomes a continuous function of time.

According to an embodiment (see FIG. 6), the method integrates a test step at the start of step (c) during which the temperature T of the built structure B is measured: if said temperature T is between the living temperature Tv and the comfort temperature Tc then step (c) is not initiated. Such a test ensures that the temperature T drops effectively below the comfort temperature Tc (in the case of the heating system) before performing geolocations and return instructions CR. Alternatively, to make the system reliable and anticipate detection of habit, steps (c) to (e) are initiated in parallel to step (b) from the start of absence. But the result of steps from (c) to (e) is taken into account (i.e. the return instruction CR is sent) only when the test step is verified. In this embodiment the test step is either in the same position as previously, except that the results of steps (c) and (d) are not taken into account, or between the steps (d) and (e).

According to an embodiment, the method integrates calculation of the derivative of the position of the user U or the derivative of estimation of the return travel time Δtr, to set up a tendency of the built structure B to move away or come closely. Typically, as soon as moving away is detected, the method restarts at step (b) so as to optimize energy savings and as soon as an approach is detected, the method restarts at the second part of step (c). Using tendencies is particularly advantageous in the event where the interval $\delta_{tm}$ is considered in addition to estimation of return travel time Δtr for calculation of the return instruction CR, since the tendency detects moving away or approach and integration of the interval $\delta_{tm}$ for calculation of the return instruction CR presupposes anticipation of travel by the user U. In such a case, step (c) may be conducted before the test preliminary previously described is true, so as to sketch a tendency before crossing the comfort temperature Tc.

To limit instructions known as fast-paced, linked to near geolocations (trampling or return travel of a few tens of meters for example) called geostatic, filtering may be applied to step (c). This filtering is typically done by the processing module 22 of the server 20.

For example, the filtering may consist of creating a circle of a certain diameter around a geolocation position and, as long as no geolocation identifies the user U outside this circle, no new return temperature Tr is updated and no return instruction CR is emitted. As soon as a geolocation identifies the user U outside this circle, a new circle is created around said geolocation. In FIG. 12, where t', t" and t''' represent those times when geolocation is carried out, the geolocations at t' and t" are considered as geostatic; such filtering is performed during the first part c1 of step (c). Alternatively, the filtering may consist of creating a return travel time interval around an estimation of return travel time Δtr and verify whether successive said estimations Δtr are inside said interval, in which case no return instruction Tr is emitted; as soon as an estimation is outside the interval, a new interval is created around this value. Such filtering is performed during the second part c2 of step (c).

Such filtering events contribute to obtaining a tiered temperature T curve.

According to an embodiment, the server 20 comprises a local learning method, by accumulation of data originating from the user U in a learning base stored on the processing module 23.

This local learning anticipates the absence of the user U and, during a previous step a0 during which a pre-limitation instruction CPL is emitted at a given time prior to absence of the user U, such that at the time $t_0$ of the absence of the user U, the built structure B is already at the comfort temperature Tc (see FIG. 13). The pre-limitation instruction CPL is thus equivalent to the limitation instruction CL, except that it is emitted before an absence is detected. It will be evident that the limitation instruction CL emitted at step (a) is confirmation of the pre-limitation instruction. In case of error, since the comfort temperature is not felt again by the body it may be raised without inconvenience to the occupant. Step (a) may in this case comprise updating of the learning base.

This local learning also defines usual places or a travel zone Z (see FIG. 14). Originally, this zone Z may be defined as a disc of radius of 100 km for example, then may be refined as per the habits of the user. Such a zone Z covers 95% of daily travel and is particularly adapted for determining travel and refining the value of the return temperature Tr.

According to an embodiment, step (c) integrates a question instruction CQ which queries the user U, via the mobile terminal 30, on his estimation of the return travel time Δtr. According to the response of the user, the return instruction CR is adapted. The question instruction CQ is thus given after the geolocation. In particular, this question may be addressed to the user via an application of the mobile terminal or via push notifications (alert message indicating to the user U even when the application is closed) to which a simple contact responds. The response supplied by the user U optimizes energy savings, preventing the return temperature Tr calculated by step (c) from being kept unuseful. In fact, the return temperature Tr is calculated so that the built structure B may be at the comfort temperature Tc when the user U returns, the user U who may begin his return travel any time. However, if it eventuates that the user is not returning, the return temperature Tr may be lower (still in the case of a heating system).

This embodiment applies particularly advantageously when the user U is outside the usual travel zone Z or, inversely, near home: in fact, a user U a few minutes away from the built structure B will ensure that the return temperature Tr of the built structure B will be kept very close to the comfort temperature Tc while user U may be absent for the entire day.

It is preferable to limit use of the question instruction CQ so as to limit interventions of the user U in management of the thermal regulation system 10.

In particular, the question instruction CQ is advantageously employed only if the filtering defined for step (c) described previously has detected a geostatic position.

Also, the method applies to several users U. In this case, step (a) is performed for each user U of the built structure B, and step (b) is performed if step (a) is verified for each user U of the built structure B: the limitation instruction CL is emitted if and only if no user U is present in the built structure B. Step (c) is performed for each user U, i.e. geolocation and estimation of the return travel time is performed for each user and step (d) is performed for the lowest possible estimation of return travel time Δtr of all estimations Δtr.

The method also applies to a plurality of built structures B. In this case, each built structure B is treated independently.

As has been mentioned, the method also applies both to heating systems and to air-conditioning systems.

In this second case, the thermal regulation system 10 comprises an air-conditioning system, the return temperature Tr being greater than the comfort temperature Tc, in turn greater than the living temperature Tv (see FIG. 15).

The invention claimed is:

1. A method for regulating the temperature of a built structure equipped with a thermal regulation system configured to regulate temperature of said built structure to a predetermined living temperature, in an operating mode by default, said method comprising, via a data-processing module, performing steps of:

(a) Detection of an absence of a user in the built structure,
(b) Emission to the thermal regulation system of an operation limitation instruction of said system by which the thermal regulation system interrupts regulation of the temperature of the built structure to the living temperature,
(c) Estimation as a function of geolocation data of the user of a return travel time of the user,
(d) Determination of a return temperature as a function of a comfort temperature different to the living temperature and of said return travel time, the return temperature being calculated to let the thermal regulation system reach the comfort temperature during the return travel time,
(e) Emission to the thermal regulation system of a return instruction, by which the thermal regulation system regulates the temperature of the built structure to the return temperature,
wherein the comfort temperature has a spread from 0.5 to 5°, preferably from 0.5 to 2°, and preferably from 0.8 to 1.2°, relative to the living temperature.

2. The method according to claim 1, wherein the limitation instruction of step (b) consists of stopping the thermal regulation system, said system then operating in a mode known as free from the start of absence of the user.

3. The method according to claim 1, wherein step (e) is performed only if the temperature of the built structure is outside an interval defined by the living and comfort temperatures.

4. The method according to claim 1, wherein step (b) comprises, when the temperature of the built structure reaches a predefined extreme temperature, emission to the thermal regulation system of a temperature maintenance instruction, by which the thermal regulation system regulates the temperature of the built structure to said extreme temperature.

5. The method according to claim 4, wherein the extreme temperature, the comfort temperature and the return temperature are determined by the data-processing module as a function of at least thermal modeling data of the built structure (B) comprising meteorological data recovered from a central server and thermal characteristics of the built structure.

6. The method according to claim 1, wherein steps (c) to (e) are repeated such that the return temperature tends towards the comfort temperature at the time when the user is again present in the built structure.

7. The method according to claim 6, wherein calculation of the return temperature takes into account the time interval between two geolocations in addition to estimation of the return travel time.

8. The method according to claim 1, wherein step (c) comprises receipt of the geolocation data from a mobile terminal of the user comprising location means.

9. The method according to claim 8, wherein step (c) comprises emission to the mobile terminal of a question instruction by which the mobile terminal queries the user on his estimation of the return travel time, such that the return temperature is adapted as a function of the response of the user.

10. The method according to claim 8, wherein detection of the absence of the user is carried out either by comparison of geolocation data of the mobile terminal of the user and geolocation reference data of the built structure, or by detection of disconnection from a local network, or by detection of absence via presence sensors.

11. The method according to claim 8, wherein step (c) comprises filtering of the geolocation data, said filtering identifying geostatic situations.

12. The method according to claim 1, comprising, when the presence of a user is detected in the built structure, a step (f) for emission to the thermal regulation system of a regulation instruction of the temperature by which the thermal regulation system switches back to the operating mode by default.

13. The method according to claim 1, comprising an prior step (a0) for emission to the thermal regulation system of a pre-limitation instruction before absence of the user, such that when the user leaves, the comfort temperature is already attained.

14. The method according to claim 13, wherein the pre-limitation instruction is triggered by local learning of absences of the user.

15. The method according to claim 1, wherein:
step (a) is performed for each user of the built structure,
step (b) is performed if step (a) is verified for each user of the built structure,
step (c) is performed for each user of the built structure,
step (d) is performed by using the lowest possible estimation of the return travel time.

16. The method according to claim 1, wherein:
the thermal regulation system comprises a heating system,
the return temperature is less than the comfort temperature, in turn less than the living temperature.

17. The method according to claim 1, wherein:
the thermal regulation system comprises an air-conditioning system,
the return temperature is greater than the comfort temperature, in turn greater than the living temperature.

18. A temperature-regulation unit of a built structure, comprising a temperature-regulation system, a data-processing server, comprising a data storage module and a data-processing module, configured to execute:
a module for detection of absence of the user,
a module for triggering an operation limitation instruction of said system by which the thermal regulation system interrupts regulation of the temperature of the built structure to the living temperature,
a module for estimation of the return travel time of the user as a function of geolocation data of the user,
a module for determination of a return temperature as a function of a comfort temperature different to the living temperature and of said return travel time, the return temperature being calculated to let the thermal regulation system reach the comfort temperature during the return travel time,
a module for emission to the thermal regulation system of a return instruction, by which the thermal regulation system regulates the temperature to the return temperature,
wherein the comfort temperature has a spread from 0.5 to 5°, preferably from 0.5 to 2°, and preferably from 0.8 to 1.2°, relative to the living temperature.

19. A built structure comprising a temperature-regulation system, and a thermostat connected to a server, according to the preceding claim, or to a server adapted to execute a method according to claim 1.

* * * * *